United States Patent
Anand

(10) Patent No.: US 10,242,037 B2
(45) Date of Patent: Mar. 26, 2019

(54) INDEX SUGGESTION ENGINE FOR RELATIONAL DATABASES

(71) Applicant: ServiceNow, Inc., Santa Clara, CA (US)

(72) Inventor: Gurnish Anand, San Francisco, CA (US)

(73) Assignee: ServiceNow, Inc., Santa Clara, CA (US)

( * ) Notice: Subject to any disclaimer, the term of this patent is extended or adjusted under 35 U.S.C. 154(b) by 98 days.

(21) Appl. No.: 15/492,839

(22) Filed: Apr. 20, 2017

(65) Prior Publication Data

US 2018/0307715 A1    Oct. 25, 2018

(51) Int. Cl.
*G06F 17/30* (2006.01)

(52) U.S. Cl.
CPC .... *G06F 17/30321* (2013.01); *G06F 17/3053* (2013.01); *G06F 17/30315* (2013.01); *G06F 17/30418* (2013.01); *G06F 17/30424* (2013.01); *G06F 17/30575* (2013.01)

(58) Field of Classification Search
CPC .......... G06F 17/3053; G06F 17/30321; G06F 17/30315; G06F 17/30418; G06F 17/30424; G06F 17/30575
USPC ........................................................ 707/741
See application file for complete search history.

(56) References Cited

U.S. PATENT DOCUMENTS

| | | | | |
|---|---|---|---|---|
| 6,507,840 B1 * | 1/2003 | Ioannidis | ........ | G06F 17/30421 |
| 8,825,629 B2 * | 9/2014 | Lawande | ........ | G06F 17/30306 |
| | | | | 707/713 |
| 10,114,846 B1 * | 10/2018 | Shah | ........ | G06F 17/30306 |
| 2008/0086444 A1 * | 4/2008 | Yu | ........ | G06F 17/30477 |
| 2011/0196857 A1 * | 8/2011 | Chen | ........ | G06F 17/30457 |
| | | | | 707/714 |
| 2014/0280190 A1 * | 9/2014 | Cronin | ........ | G06F 17/30539 |
| | | | | 707/741 |
| 2017/0116428 A1 * | 4/2017 | Wu | ........ | G06F 21/6209 |

FOREIGN PATENT DOCUMENTS

WO    WO 2015/017361 A1 *    2/2015    ............. G06F 17/00

OTHER PUBLICATIONS

Leis, Viktor, et al., "How Good Are Query Optimizers, Really?", Proc. of the VLDB Endowment, vol. 9, No. 3, © 2015, pp. 204-215.*

(Continued)

*Primary Examiner* — Robert Stevens
(74) *Attorney, Agent, or Firm* — Fletcher Yoder PC

(57) ABSTRACT

Creating and executing flow plans by performing at least the following: obtaining a run-time flow plan that comprises a trigger, a first operation, and a second operation, wherein the first operation precedes the second operation within the run-time flow plan and one or more input values of the second operation are linked to the first operation, determining whether one or more conditions of the trigger are met, execute the first operation based at least on the determination that the one or more conditions of the trigger are met, monitoring whether the second operation is ready for execution based at least on a determination that the one or more input values of a second action operation are ready, and executing the second action operation when the second action operation has been identified as ready for execution.

20 Claims, 7 Drawing Sheets

(56) References Cited

OTHER PUBLICATIONS

Roy, Prasan, et al., "Towards Automatic Association of Relevant Unstructured Content with Structured Query Results", CIKM '05, Bremen, Germany, Oct. 31-Nov. 5, 2005, pp. 405-412.*
Seshadri, Praveen, et al., "Generalized Partial Indexes", ICDE 1995, Taipei, Taiwan, Mar. 6-10, 1995, pp. 420-427.*
Ioannidis, Yannis, "The History of Histograms (abridged)", Proc. of the 29th VLDB Conference, Berlin, Germany, © 2003, pp. 19-30.*

* cited by examiner

FIG. 5

| | | U_active | U_incident_category | U_asset_sub_type | U_ge_asset_class | U_asset_type | U_used_by | U_cmdb_ci |
|---|---|---|---|---|---|---|---|---|
| 1 | DISTINCT Cardinality | 2 | 2091 | 39 | 29 | 118 | 23 | 4585 |
| 2 | Cardinality Weight | 50 | 0.047 | 2.56 | 3.44 | 0.84 | 4.34 | 0.02 |
| 3 | IS NULL | 0 | 0 | 406,241 | 0 | 0 | 306,098 | 10052 |
| 4 | IS_NULL Weight | 0 | 0 | 99 | 0 | 0 | 74 | 2.45 |
| 5 | LIKE_%_start_Weight | 0 | 100 | 0 | 0 | 0 | 100 | 0 |
| 6 | Like_%_end_Weight | 0 | 20 | 0 | 0 | 0 | 20 | 0 |
| 7 | Total_Weight | 50 | 120.47 | 101.56 | 3.44 | 0.84 | 198.34 | 2.47 |

| | Sys_user rows=1614580 | | | | cmn_location=139679 |
|---|---|---|---|---|---|
| | Sys_user.Active | U_buisness_segment | U_business_unit | U_legal_entitiy | Location | Cmn_location.Country |
| 1 DISTINCT Cardinality | 2 | 299 | 3419 | 779 | 44317 | 251 |
| 2 Cardinality Weight | 50 | 0.33 | 0.02 | 0.13 | 0.002 | 0.4 |
| 3 IS NOT NULL | 0 | 0 | 0 | 886804 | 0 | 0 |
| 4 IS_NOT_NULL_Weight | 0 | 0 | 0 | 54 | 0 | 0 |
| 5 Total_Weight | 50 | 0.33 | 0.02 | 54.13 | 0.002 | 2.47 |

600

INDEX SUGGESTION ENGINE FOR RELATIONAL DATABASES

TECHNICAL FIELD

Embodiments described herein generally relate to databases, such as those utilized in cloud computing, and in particular for an index suggestion engine for relational databases.

BACKGROUND ART

Cloud computing relates to the sharing of computing resources that are generally accessed via the Internet. In particular, cloud computing infrastructure allows users to access a shared pool of computing resources, such as servers, storage devices, networks, applications, and/or other computing based services. By doing so, users, such as individuals and/or enterprises, are able to access computing resources on demand that are located at remote locations in order to perform a variety computing functions that include storing and/or processing computing data. For users, cloud computing provides flexibility in accessing cloud computing resources without accruing up-front costs, such as purchasing network equipment, and investing time in establishing a private network infrastructure. Instead, by utilizing cloud computing resources, enterprise users are able redirect their resources to focus on core enterprise functions.

In today's communication networks, examples of cloud computing services a user may utilize include software as a service (SaaS) and platform as a service (PaaS) technologies. SaaS is a delivery model that provides software as a service rather than an end product. Instead of utilizing local network or individual software installations, software is typically licensed on a subscription basis, hosted on a remote machine, and accessed as needed. For example, users are generally able to access a variety of enterprise and/or information technology (IT) related software via a web browser. PaaS acts an extension of SaaS that goes beyond providing software services by offering customizability and expandability features to meet a user's needs. For example, PaaS can provide a cloud based developmental platform for users to develop, modify, and/or customize applications and/or for automating enterprise operations without maintaining network infrastructure and/or allocating computing resources normally associated with these functions.

Within the context of automating enterprise, IT, and/or other organization-related functions (e.g., human resources (HR)), PaaS and SaaS often respond to incoming user requests by providing concurrent threads of execution, each of which may respond to an individual request, while maintaining per-user information access. These requests often require different types of searches, calculations or modifications of data stored in large databases. As a result of this environment, database applications utilized by web environments generally are required to logically maintain numbers of large result sets, and to be able to perform multiple types of calculations or insertions with high efficiency to maintain a reasonable performance level for the users. Innovative tools are needed to assist in effective control and analysis of this data within computer and communication network environments. Such tools may include tools for suggesting indexes for relational databases.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one embodiment, a system that receives a database query, parses the database query to identify a plurality of columns in one or more database tables, sorts at least some of the identified plurality of columns based a database operation in the database query, determines a histogram of values for each column of the sorted columns based on characteristics of fields in each column, determines a total weight for each column of the sorted columns based on the histogram, selects a column from the sorted columns based on the total weight for each column, and generates a suggested database index based on the selected column.

In another embodiment, a method for suggesting a database index, comprising receiving a database query, parsing the database query to identify a plurality of columns in one or more database tables, sorting at least some of the identified plurality of columns based a database operation in the database query, determining a histogram of values for each column of the sorted columns based on characteristics of fields in each column, determining a total weight for each column of the sorted columns based on the histogram, selecting a column from the sorted columns based on the total weight for each column, and generating a suggested database index based on the selected column.

In yet another embodiment, a computer readable medium for containing instructions that, when executed by a processor cause a programmable device to receive a database query, parse the database query to identify a plurality of columns in one or more database tables, sort at least some of the identified plurality of columns based a database operation in the database query, determine a histogram of values for each column of the sorted columns based on characteristics of fields in each column, determine a total weight for each column of the sorted columns based on the histogram, select a column from the sorted columns based on the total weight for each column, and generate a suggested database index based on the selected column.

BRIEF DESCRIPTION OF DRAWINGS

For a more complete understanding of this disclosure, reference is now made to the following brief description, taken in connection with the accompanying drawings and detailed description, wherein like reference numerals represent like parts.

FIG. 5 illustrates a histogram, according to one embodiment.

FIG. 6 illustrates a histogram, according to one embodiment.

DESCRIPTION OF EMBODIMENTS

Figure 1:
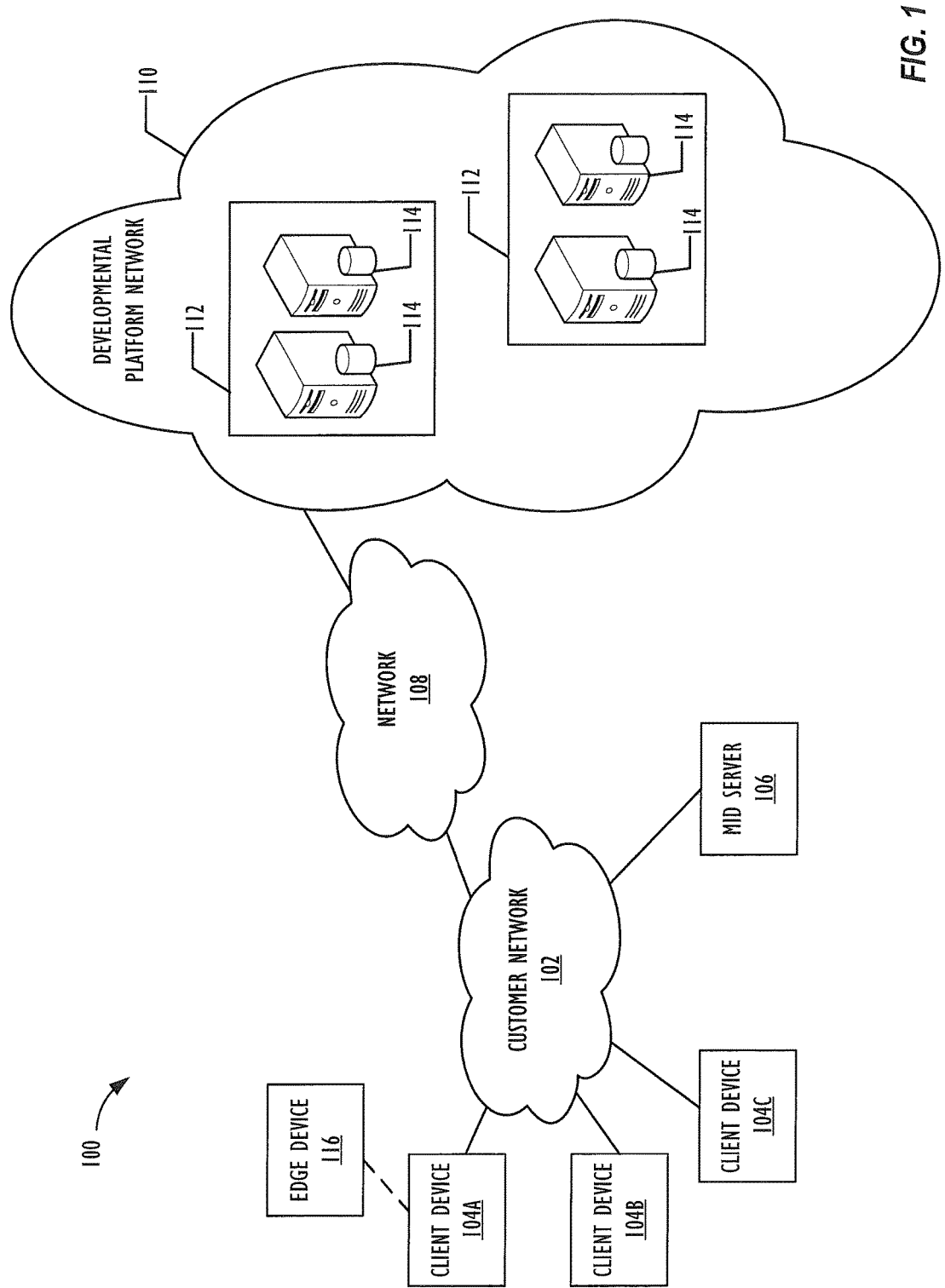
FIG. 1 is a schematic diagram of an embodiment of a network computing system where embodiments of the present disclosure may operate herein.

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

As used herein, the term "computing system" refers to a single electronic computing device that includes, but is not limited to a single computer, virtual machine, virtual container, host, server, laptop, and/or mobile device or to a plurality of electronic computing devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the term "application" refers to one or more computing modules, programs, processes, workloads, threads and/or a set of computing instructions executed by a computing system. Example embodiments of an application include software modules, software objects, software instances and/or other types of executable code.

Various example embodiments are disclosed herein for an index suggestion algorithm for relational databases. While described within context of a cloud computing environment, nothing in this disclosure is intended to limit embodiments of the present disclosure to cloud computing environments and embodiments of the present disclosure may be implemented in a variety of environments, such as in a stand-alone database application. Many applications, including cloud based services, utilize databases to collect, organize, and access data within various tables, queries and reports. Data within databases are generally organized in a way to support processing or accessing the data in meaningful ways. One such way is using a relational model of database management, or a relational database. This approach manages data within the database using a structure and language consistent with first order predicate logic. Data may be represented in tuples, or rows, and grouped into relations, or tables. Data elements may include various attributes, represented by columns of a table.

Database indexes may be implemented to help speed up data access operations on database tables. Indexes may be used to help quickly locate data without having to perform searches across rows to access data. Each index is defined and exists within the context of one or more tables in the database. Many indexes are optional, and are created by the user to enhance the speed of one or more queries performed on a table. The user can define more than one index for the same table, basing the indexes on different columns defined in the table. When the user defines an index based on columns in the table, the user is requesting the database to create a separate sorted list of all values of that column in that table, with a link from each value of the column to the location of the corresponding record in the table.

Data may be requested from a database via a query. Queries generally are formed in a database query language, such as structured query language (SQL). In SQL, queries may make use of the SELECT clause, which retrieves data from one or more tables. WHERE clauses may filter, or restrict, the rows returned by a query by eliminating all rows from a specified set which do not evaluate to true. SQL may also include a JOIN clause which allows multiple tables to be joined into a query. SQL includes Boolean logic operators, such as AND and OR, which may be used to modify a query. Clauses such as GROUP BY and ORDER BY may group or sort rows and columns to reduce duplicate information or provide sorting functionality. Certain queries may be run repeatedly, such as a query for generating a daily report.

Certain queries may run slower than others for a variety of reasons. In certain cases, adding indexes may help slowly executing queries execute in less time. However, determining what to include in an index that would be helpful in speeding up execution of a particular query is a specialized and difficult problem typically addressed by hand-tuning. Therefore a technique for suggesting an index to assist a particular query and verify that the suggested index does help a query execute faster is desirable.

According to certain aspects, query execution times, for a given relational database, may be collected in order to determine that a query is executing slowly. An index may then be suggested to help this slow query execute faster. This index suggestion may be propagated to a user and, after user approval, used to create the suggested index. After the creation of the index, execution speed of the query may be monitored to determine whether the average performance of the query has increased as compared to the average performance before the creation of the index. If performance of the query is substantially improved, the index may be kept. If performance is degraded or not substantially improved, the index may be removed, or a suggestion to remove the index may be propagated to the user.

FIG. 1 is a schematic diagram of an embodiment of a computing system 100, such as a cloud computing system, where embodiments of the present disclosure may operate herein. Computing system 100 may include a customer network 102, network 108, and developmental platform network 110. In one embodiment, the customer network 102 may be a local private network, such as local area network (LAN) that includes a variety of network devices that include, but are not limited to switches, servers, and routers. In another embodiment, the customer network 102 represents an enterprise network that could include one or more local area networks (LANs), virtual networks, data centers 112 and/or other remote networks. As shown in FIG. 1, the customer network 102 is able to connect to one or more client devices 104A-C so that the client devices are able to communicate with each other and/or with the developmental platform network 110. The client devices 104A-C may be computing systems and/or other types of computing devices generally referred to as Internet of Things that access cloud computing services, for example, via a web browser application or via an edge device 116 that may act as a gateway between the client device and the remote device. FIG. 1 also illustrates that the customer network 102 includes a management, instrumentation, and discovery (MID) servers 106 that facilitate communication of data between the developmental platform network 110, other external applications, data sources, and services, and the customer network 102. Although not specifically illustrated in FIG. 1, the customer network 102 may also include a connecting network device (e.g., gateway or router) or a combination of devices that implement a customer firewall or intrusion protection system.

FIG. 1 illustrates that customer network 102 is coupled to a network 108. The network 108 may include one or more computing networks available today, such as other LANs, wide area networks (WAN), the Internet, and/or other remote networks, in order to transfer data between the client devices 104A-C and the developmental platform network 110. Each of the computing networks within network 108 may contain wired and/or wireless programmable devices that operate in the electrical and/or optical domain. For example, network 108 may include wireless networks, such as cellular networks (e.g., Global System for Mobile Communications (GSM) based cellular network) wireless fidelity (Wi-Fi®) networks, and/or other suitable radio based network as would be appreciated by one of ordinary skill in the art upon viewing this disclosure. The network 108 may also employ any number of network communication protocols, such as Transmission Control Protocol (TCP) and Internet Protocol (IP). Although not explicitly shown in FIG. 1, network 108 may include a variety of network devices, such as servers, routers, network switches, and/or other network hardware devices configured to transport data over networks.

In FIG. 1, the developmental platform network 110 may be a remote network (e.g., a cloud network) that is able to communicate with the client devices 104A-C via the customer network 102 and network 108. The developmental platform network 110 acts as a platform that provides additional computing resources to the client devices 104A-C and/or customer network 102. For example, by utilizing the developmental platform network 110, users of client devices 104A-C are able to build and execute applications, such as automated processes for various enterprise, IT, and/or other organization-related functions. In one embodiment, the developmental platform network 110 includes one or more data centers 112, where each data center 112 could correspond to a different geographic location. Within the data center 112 include a plurality of server instances 114. Each server instance 114 can be implemented on a physical computing system, such as a single electronic computing device (e.g., a single physical hardware server) or could be in the form a multi-computing device (e.g., multiple physical hardware servers). Examples of server instances 114 include, but are not limited to a web server instance (e.g., a unitary Apache installation), an application server instance (e.g., unitary Java Virtual Machine), and/or a database server instance (e.g., a unitary MySQL catalog).

To utilize computing resources within the developmental platform network 110, network operators may choose to configure the data centers 112 using a variety of computing infrastructures. In one embodiment, one or more of the data centers 112 are configured using a multi-tenant cloud architecture such that a single server instance 114, which can also be referred to as an application instance, handles requests and serves multiple customers. In other words, data centers with multi-tenant cloud architecture commingle and store data from multiple customers, where multiple customer instances are assigned to a single server instance 114. In a multi-tenant cloud architecture, the single server instance 114 distinguishes between and segregates data and other information of the various customers. For example, a multi-tenant cloud architecture could assign a particular identifier for each customer in order to identify and segregate the data from each customer. Generally, implementing a multi-tenant cloud architecture suffer drawbacks, such as a failure to single server instance 114 causing outages for all customers allocated to the single server instance 114.

In another embodiment, one or more of the data centers 112 are configured using a multi-instance cloud architecture to provide every customer its own unique customer instance. For example, a multi-instance cloud architecture could provide each customer instance with its own dedicated application server and dedicated database server. In other examples, the multi-instance cloud architecture could deploy a single server instance 114 and/or other combinations of server instances 114, such as one or more dedicated web server instances, one or more dedicated application server instances, and one or more database server instances, for each customer instance. In a multi-instance cloud architecture, multiple customer instances could be installed on a single physical hardware server where each customer instance is allocated certain portions of the physical server resources, such as computing memory, storage, and processing power. By doing so, each customer instance has its own unique software stack that provides the benefit of data isolation, relatively less downtime for customers to access the developmental platform network 110, and customer-driven upgrade schedules. An example of implementing a customer instance within a multi-instance cloud architecture will be discussed in more detail below when describing FIG. 2.

Figure 2:
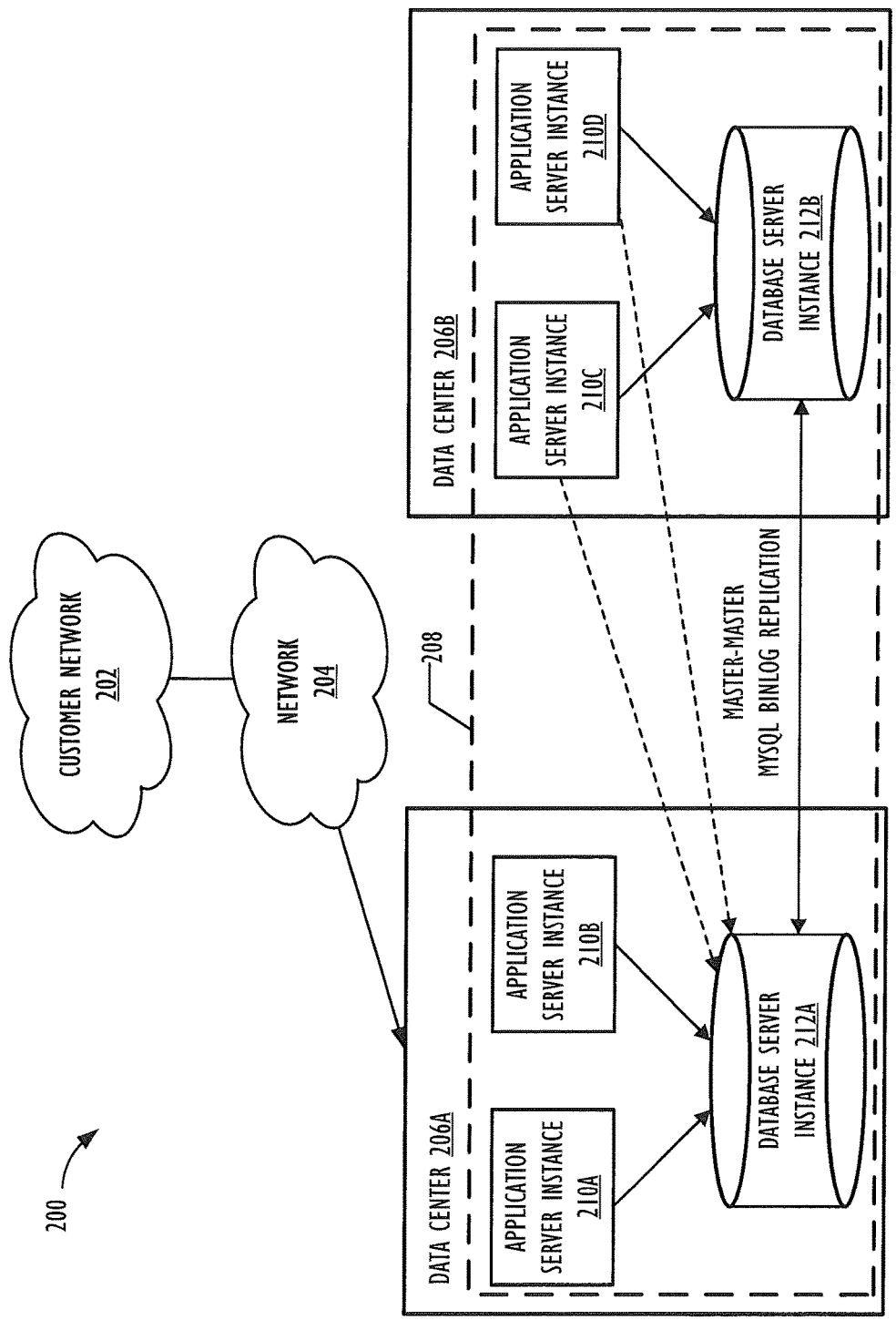
FIG. 2 is a schematic diagram of an embodiment of a multi-instance cloud architecture where embodiments of the present disclosure may operate herein.

FIG. 2 is a schematic diagram of an embodiment of a multi-instance cloud architecture 200 where embodiments of the present disclosure may operate herein. FIG. 2 illustrates that the multi-instance cloud architecture 200 includes a customer network 202 that connects to two data centers 206A and 206B via network 204. Customer network 202 and network 204 are substantially similar to customer network 102 and network 108 as described in FIG. 1, respectively. Data centers 206A and 206B can correspond to FIG. 1's data centers 112 located within developmental platform network 110. Using FIG. 2 as an example, a customer instance 208 is composed of four dedicated application server instances 210A-210D and two dedicated database server instances 212A and 212B. Stated another way, the application server instances 210A-210D and database server instances 212A and 212B are not shared with other customer instances 208. Other embodiments of the multi-instance cloud architecture 200 could include other types of dedicated server instances, such as a web server instance. For example, the customer instance 208 could include the four dedicated application server instances 210A-210D, two dedicated database server instances 212A and 212B, and four dedicated web server instances (not shown in FIG. 2).

To facilitate higher availability of the customer instance 208, the application server instances 210A-210D and database server instances 212A and 212B are allocated to two different data centers 206A and 206B, where one of the data centers 206 acts as a backup data center. In reference to FIG. 2, data center 206A acts as a primary data center 206A that includes a primary pair of application server instances 210A and 210B and the primary database server instance 212A for the customer instance 208, and data center 206B acts as a secondary data center 206B to back up the primary data center 206A for a customer instance 208. To back up the primary data center 206A for the customer instance 208, the secondary data center 206 includes a secondary pair of application server instances 210C and 210D and a secondary database server instance 212B. The primary database server instance 212A is able to replicate data to the secondary database server instance 212B. As shown in FIG. 2, the primary database server instance 212A replicates data to the secondary database server instance 212B using a Master-Master MySQL Binlog replication operation. The replication of data between data could be implemented in real time by implementing full backup weekly and daily incremental backups in both data centers 206A and 206B. Having both a primary data center 206A and secondary data center 206B allows data traffic that typically travels to the primary data center 206A for the customer instance 208 to be diverted to the second data center 206B during a failure and/or maintenance scenario. Using FIG. 2 as an example, if the application server instances 210A and 210B and/or primary data server instance 212A fails and/or is under maintenance, data traffic for customer instances 208 can be diverted to the secondary application server instances 210C and 210D and the secondary database server instance 212B for processing.

Although FIGS. 1 and 2 illustrate specific embodiments of a cloud computing system 100 and a multi-instance cloud architecture 200, respectively, the disclosure is not limited to the specific embodiments illustrated in FIGS. 1 and 2. For instance, although FIG. 1 illustrates that the developmental platform network 110 is implemented using data centers, other embodiments of the of the developmental platform network 110 are not limited to data centers and can utilize other types of infrastructures. Moreover, other embodiments of the present disclosure may combine one or more different server instance into a single server instance. Using FIG. 2 as an example, the application server instances 210 and database server instances 212 can be combined into a single server instance. The use and discussion of FIGS. 1 and 2 are only examples to facilitate ease of description and explanation.

According to certain aspects, execution times of database queries may be tracked and slow queries identified. This identification may be made in a variety of ways. For example, a threshold time duration may be defined and queries exceeding the threshold time duration may be identified as slow. As another example, a number or percentage of slowest running queries of a set of queries may be identified as slow. The identification of slow queries may also take into account the number of times a particular query is executed over a certain time period. Suggested indexes may be generated in order to help a slow query execute in less time. The index suggestion may be generated algorithmically based on a selectivity associated with clauses of the slow query in question.

After the slow query has been identified, the query may be parsed to group the columns. A histogram may be created based on the grouped columns to determine what columns referenced by the query should be included in the suggested index. Additionally, a set of special case rules may be applied to handle cases where a suggested index may not be beneficial.

Figure 3:
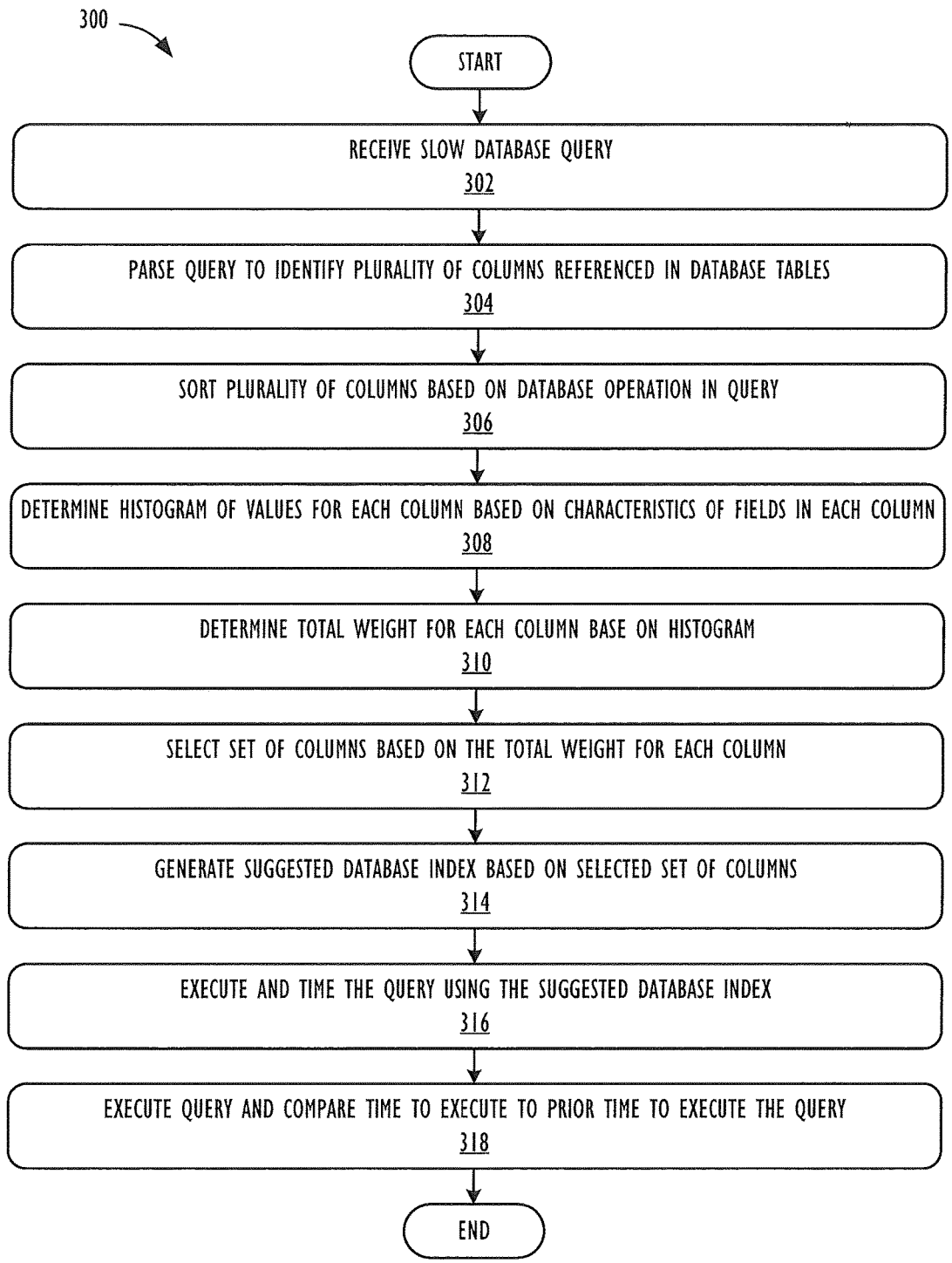
FIG. 3 is a flow diagram illustrating a technique for suggesting an index, according to one embodiment.

FIG. 3 is a flow diagram illustrating a technique for suggesting an index 300, according to one embodiment. At step 302, an index suggestion module receives a database query identified as executing slowly. At step 304, the index suggestion module parses the database query to identify a plurality of columns in one or more database tables. At step 306, the index suggestion module sorts at least some of the identified plurality of columns based a database operation in the database query. At step 308, the index suggestion module determines a histogram of values for each column of the sorted columns based on characteristics of fields in each column. At step 310, the index suggestion module determines a total weight for each column of the sorted columns based on the histogram. At step 312, the index suggestion module selects a column from the sorted columns based on the total weight for each column. At step 314, the index suggestion engine generates a suggested database index based on the selected column. At step 316, the database query is executed taking into account the suggested database index and recording a time to execute the database query. At step 318, the time to execute the database query is compared to a prior time to execute the database query, recorded before the suggested database index was determined. If the time to execute the database query is faster than the prior time by a threshold amount, the suggested index may be retained. Otherwise, the suggested database index may be deleted. In some cases, a recommendation that the suggested database index be deleted may be presented to a user.

Figure 4:
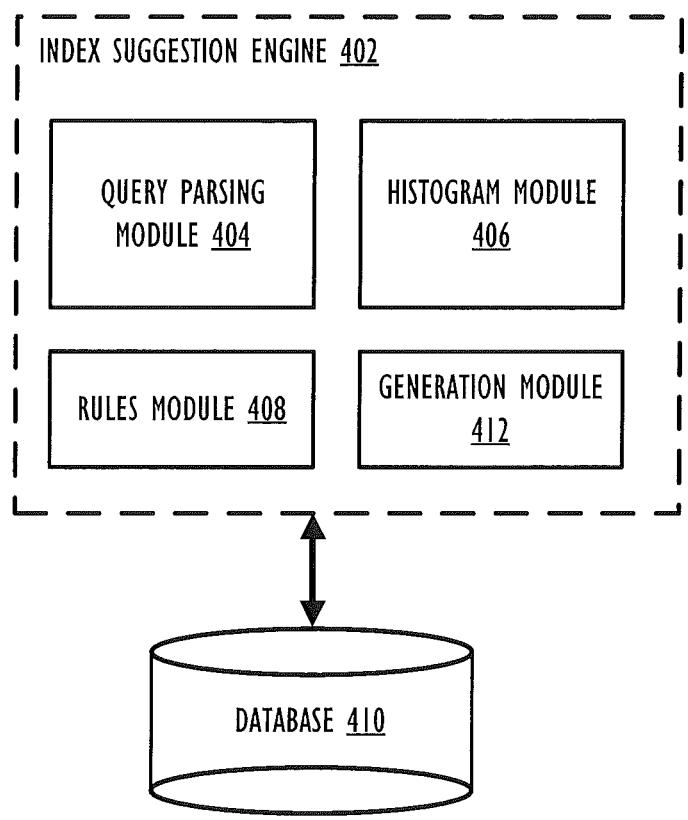
FIG. 4 is block diagram illustrating a system for suggesting an index, according to one embodiment.

FIG. 4 is a block diagram illustrating a system for suggesting an index 400, according to one embodiment. The system for suggesting an index may include an index suggestion engine 402, along with a database 410. The index suggestion engine 402 may execute within the context of an application server instance, as a part of a management console, or as a module separate from the application server. The index suggestion engine 402 may comprise a query parsing module 404, which may parse and group fields of the table based on the clauses of the query to identify columns. A histogram module 406 may create a histogram based on the identified columns and evaluate a set of weights for the columns. A special rules module 408 may evaluate the columns of the histogram based on a set of special case rules. A generation module 412 may generate a suggested index based on the histogram and evaluation.

As an example for creating a suggested index, consider the below sample query referencing a single table u_cmdb_inc_hierarchy having 408817 rows:

SELECT u_cmdb_inc_hierarchy0.'u_incident_category' AS 'u_incident_category' FROM u_cmdb_inc_hierarchy u_cmdb_inc_hierarchy0 WHERE u_cmdb_inc_hierarchy0.'u_active' = 1 AND u_cmdb_inc_hierarchy0.'u_incident_category' NOT LIKE -continued

```
'%generic%' AND u_cmdb_inc_hierarchy0.'u_asset_sub_type' IS NULL
AND u_cmdb_inc_hierarchy0.'u_ge_asset_class' = 'Application' AND
u_cmdb_inc_hierarchy0.'u_asset_type' = 'Business Application'
AND (u_cmdb_inc_hierarchy0.'u_used_by' LIKE
'%fba92c0f9cca2400a86ffc3c0bfdb604%' OR
u_cmdb_inc_hierarchy0.'u_used_by' IS NULL ) AND
(u_cmdb_inc_hierarchy0.'u_cmdb_ci' =
'6d72a79a6f4455405cebb8c6eb3ee4c4' OR
u_cmdb_inc_hierarchy0.'u_cmdb_ci' IS NULL ) GROUP BY
u_cmdb_inc_hierarchy0.'u_incident_category' ORDER BY
u_cmdb_inc_hierarchy0.'u_incident_category';
```

Prior to analyzing the columns referenced by a query, the query may be parsed. The parsed columns may be sorted and grouped based on the clauses of the query. For example, columns may be grouped based on clauses referencing the columns, such as the filter clauses, JOIN clauses, ORDER BY and GROUP BY clauses, and SELECT clauses. WHERE clauses may be used as a filter for columns by restricting the rows returned by the query and these clauses may be the most important. JOIN clauses may be the next most important as JOIN clauses help join tables in memory. ORDER BY and GROUP BY clauses are less important, but still help reduce CPU usage and sorting on disk. Lastly, SELECT clauses help make a covering index with the other identified columns. AND or OR clauses apply Boolean logic to multiple columns and an AND or OR may be evaluated as a part of a preceding clause.

Returning to the example query, the example query may be identified as slow executing and received by the index suggestion engine. The query is parsed by the index suggestion engine and the various columns referenced in the query grouped. The column U_active may be identified as a filter column based on the WHERE clause portion of the query, "WHERE u_cmdb_inc_hierarchy0.'u_active'." Additionally, columns u_incident_category, U_asset_sub_type, U_ge_asset_class, U_asset_type, U_used_by, and U_cmdb_ci may also be identified as filters as these columns are evaluated as a part of the WHERE clause as they are a part of the WHERE clause based on an AND or OR clause. These columns may then be grouped together. While in this example, the query does not have a JOIN clause, there are ORDER BY and GROUP BY clauses. Columns associated with these clauses may be grouped after the filter and JOIN clauses. However, in this case, column U_incident_category is already grouped with the filter clauses and is not included in another group. In this example, the SELECT clause may be associated with the u_incident_category column, but again the u_incident_category is associated with the filter clause and not separately grouped.

Generally, placing higher cardinality columns first in an index is preferable as it places columns with the highest selectivity first and these columns may then be used by a query prior to using columns having a lower selectivity. The cardinality of a column may be determined using a histogram for determining a total weight for the column.

The groups of columns may be used to order columns of a histogram. FIG. 5 illustrates a histogram 500, according to one embodiment. As shown, the groups of columns identified by the grouping may be aligned as columns in the histogram 500. The order of the groups of columns may be, from left to right, based on groups of columns referenced by filter clauses, then JOIN clauses, then ORDER BY and GROUP BY clauses, and then SELECT clauses. Order within a group may be based on an order by which the columns of the group appear in the query. Applying these rules, the column order for the above example is u_active, followed by filter columns u_incident_category, U_asset_sub_type, U_ge_asset_class, U_asset_type, U_used_by, and U_cmdb_ci.

After the ordering of the columns for the histogram 500 is determined, rules may be used to add rows to the histogram. The rows of the histogram 500 may be used to determine a set of weights for each column. Certain rows may be added for all queries. For example, rows for evaluating the distinct cardinality and according the distinct cardinality a weight may be added for all queries. In the first row of the histogram 500, DISTINCT Cardinality may be determined based on a command such as select Count (distinct column_X) to determine a number of distinct values in a particular column, without duplicates. In the second row of the histogram 500, a weight factor for the distinct cardinality, Cardinality_weight, may be determined by dividing 100 by the DISTINCT Cardinality value.

Operators of the query may be used to determine additional rules and rows for the histogram. Operators may be associated with rules for adding rows to the histogram to evaluate the data fields of the columns referenced by the operators. These rules may be predefined for each available operator in a given database language. A rule may add one or more rows for a given operator. A row of the one or more rows may determine a weight for the operator and column. This weight may be based on another row that evaluates the operator for values in the column. A total weight may be determined, in another row, by summing the determined weights for each operator.

Returning to the example query, in the query, operators "LIKE" and "IS NULL" appear. Rules for adding rows may be applied to determine weights for these operators. For example, where the query includes the IS NULL operator, a first row may be added which evaluates the values of a column and counts the number of times the operator condition is true in a given column. The third row of the histogram 500 looks at the columns referenced by the NULL operator and counts the number of rows within that column with a value of null. A second row evaluating the weight of the first row may also be added based on the rule. The fourth row may determine a weight, IS_NULL Weight, based on the number of null rows for a column by dividing the number of null rows by the total number of rows and multiplying that by 100.

In certain cases, a rule for an operator may indicate that a weight for the operator is based on the query string. For example, the fifth row of histogram 500 may determine a weight factor for a column based on whether the LIKE command, contains a % character at the beginning of the string and assigning a weight of 100 if the string begins with a % character. Likewise the sixth row of histogram 500 adds a weight of 20 when the string ends with a % character.

A row determining a total weight of the column may also be added, summing the operator weight rows for a column. For example, the seventh and last row of histogram 500 may be a total weight row, which may comprise a sum of the operator weight rows. In this example, the total weight may be the sum of Cardinality_Weight, IS_NULL_Weight, Like_%_start_Weight, and Like_%_end_weight.

After total weights are determined for each column, the column having the smallest total weight, and thus highest cardinality, is selected as the first column for an index. For example, for the set of columns in FIG. 5, an index for table u_cmdb_inc_hierarchy may be suggested with columns in an order (u_asset_type, u_cmdb_ci, u_ge_asset_class, u_active, u_incident_category).

A set of special case rules may also be applied to certain queries and used to modify the histogram. For example, in certain cases, it may be known that certain columns are not useful as a part of an index or it may be known that certain queries may not be helped by an index. Rules describing these cases may be encoded as special case rules. As a more specific example, in some cases, a query may include a query plan indicating how the query may be executed. This query plan may include a column indicating the query contains an impossible WHERE, which may indicate that the WHERE clause is always false. These WHERE clauses may be ignored. Additionally, queries without filters, queries with non-existent WHERE clauses, and queries comprising of just primary key lookups may also be ignored.

FIG. 6 illustrates a histogram 600, according to one embodiment. Where multiple tables are referenced by a single query, a driving table for the query may be identified. Generally the driving table is the table used to start processing a query. Where there is only a single table in the query, that table is the driving table, but when multiple tables are referenced in a query, a driving table may be identified.

Where multiple tables are present, columns may be grouped by table as well as by the filters used, columns joined, column ordering and grouping and selected columns used. For example, the following query references two tables, Sys_user, and cmn_location.

```
SELECT sys_user0.'sys_id' FROM (sys_user sys_user0 LEFT
JOIN cmn_location cmn_location1 ON sys_user0.'location' =
cmn_location1. 'sys_id' ) WHERE sys_user0.'active' = 1 AND
cmn_location1. 'country' = 'United States' AND
sys_user0.'u_business_segment' = 'Digital Channels & Business
Development' AND sys_user0.'u_business_unit' = 'Dig-C&BD-
Strategic Telco' AND sys_user0.'u_legal entity' IS NOT NULL
limit 0,1\G.
```

As shown, the table Sys_user references columns Sys_user_Active, U_buisness_segment, U_business_unit, U_legal_entity, and Location, while the cmn_location table references a Cmn_location.Country column. Columns Sys_user_Active, U_buisness_segment, U_business_unit, U_legal_entity of Sys_user and Cmn_location.Country of cmn_location may be identified as filter columns based on parsing the query string. The filter columns of Sys_user may be grouped together in the leftmost columns of the histogram 600, followed by JOIN column location. The column cmn_location is grouped and placed after the columns of Sys_user as the table cmn_location appears after Sys_user in the query string. The rows of histogram 600 may be created in a manner similar to that described above for histogram 500.

After total weights are determined for each column, the total weights for the columns of each table are separately summed and the table having the highest total weight (i.e., highest selectivity) is selected as the driving table. A suggested index may then be created using this driving table. The order in which the columns appear in the suggested index may be based on the total weight of the columns of the driving table. For example the suggested index sys_user (u_business_unit, location, u_business_segment, active, u_legal_entity) may be created based on histogram 600.

In certain cases, the first column for the suggested index comprises a filter column. In the example based on histogram 600, even though the location column has the lowest weight (i.e., highest cardinality), u_business_unit is selected as the first column for the suggested index as the location column is a JOIN column rather than a filter column.

Figure 7:
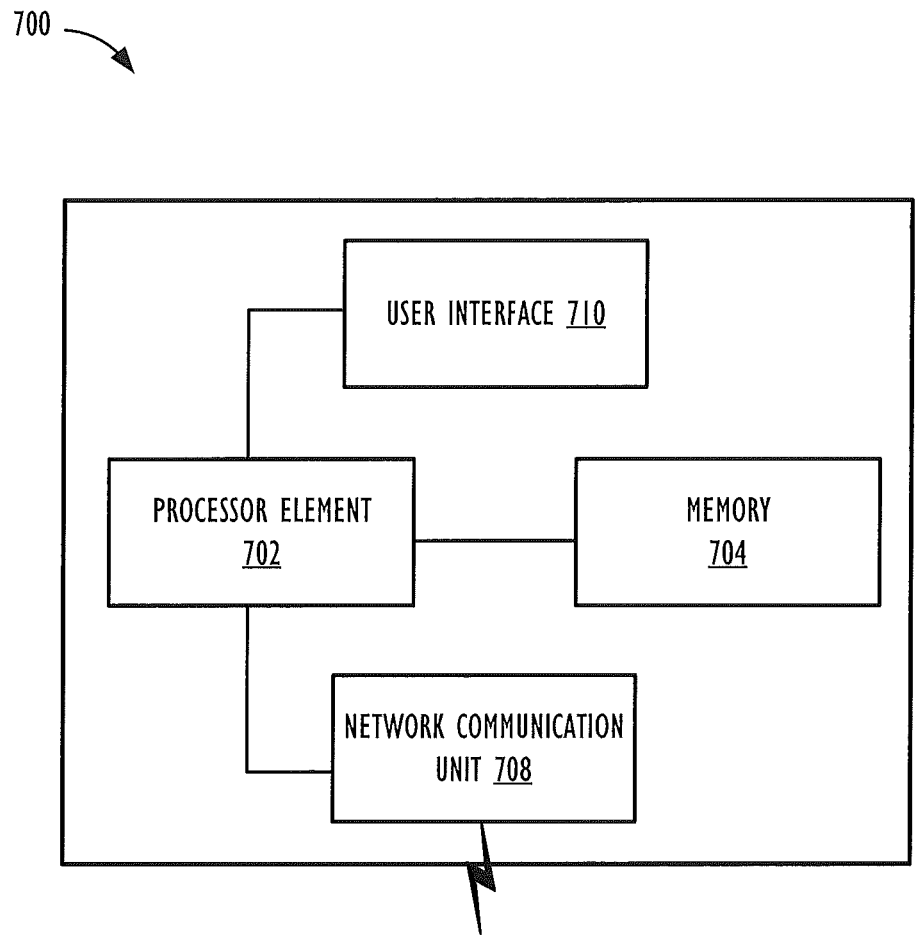
FIG. 7 is a block diagram illustrating an embodiment of computing system for use with techniques described herein.

Referring now to FIG. 7, a block diagram illustrates a computing device 700 that may be used for implementing the % piques described herein in accordance with one or more embodiments (e.g., flow diagram 300, system for suggesting an index 400, histogram 500, and histogram 600). For example, the computing device 700 illustrated in FIG. 7 could represent a client device or a physical server device. As shown in FIG. 7, the computing device 700 can include can also include one or more input/output devices, such as a network communication unit 708 that could include a wired communication component and/or a wireless communications component, which can be coupled to processing element 702. The network communication unit 708 can utilized any of a variety of standardized network protocols, such as Ethernet, TCP/IP, to name a few of many protocols, to effect communications between devices and comprise one or more transceiver(s) that utilize the Ethernet, power line communication (PLC), WiFi, and/or other communication methods.

The computing system 700 includes a processing element 702 that contains one or more hardware processors, where each hardware processor may have a single or multiple processor cores. In one embodiment, the processing element 702 may include at least one shared cache that store data (e.g., computing instructions) that are utilized by one or more other components of processing element 702. For example, the shared cache may be locally cache data stored in a memory for faster access by components of the processing elements 702. In one or more embodiments, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) a microprocessor. Although not illustrated in FIG. 7, the processing element 700 may also include one or more other types of hardware processing components, such as graphics processing units (GPU), application specific integrated circuits (ASICs), field-programmable gate arrays (FPGAs), and/or digital signal processors (DSPs).

FIG. 7 illustrates that memory 704 may be operatively coupled to processing element 702. Memory 704 may be a non-transitory medium configured to store various types of data. For example, memory 704 may include one or more memory devices that comprise a non-volatile storage device and/or volatile memory. Volatile memory, such as random access memory (RAM), can be any suitable non-permanent storage device. The non-volatile storage devices can include one or more disk drives, optical drives, solid-state drives (SSDs), tap drives, flash memory, read only memory (ROM), and/or any other type memory designed to maintain data for a duration time after a power loss or shut down operation. In certain instances, the non-volatile storage device may be used to store overflow data if allocated RAM is not large enough to hold all working data. The non-volatile storage device may also be used to store programs that are loaded into the RAM when such programs are selected for execution.

Persons of ordinary skill in the art are aware that software programs may be developed, encoded, and compiled in a variety computing languages for a variety software platforms and/or operating systems and subsequently loaded and executed by processing element 702. In one embodiment, the compiling process of the software program may transform program code written in a programming language to another computer language such that the processing element 702 is able to execute the programming code. For example, the compiling process of the software program may generate an executable program that provides encoded instructions (e.g., machine code instructions) for processor 702 to accomplish specific, non-generic, particular computing functions.

After the compiling process, the encoded instructions may then be loaded as computer executable instructions or process steps to processing element 702 from storage (e.g., memory 704) and/or embedded within the processing element 702 (e.g., cache). Processing element 702 can execute the stored instructions or process steps in order to perform instructions or process steps to transform the computing device into a non-generic, particular, specially programmed machine or apparatus. Stored data, e.g., data stored by a storage device, can be accessed by processing element 702 during the execution of computer executable instructions or process steps to instruct one or more components within the computing device 700.

A user interface 710 can include a display, positional input device (such as a mouse, touchpad, touchscreen, or the like), keyboard, or other forms of user input and output devices. The user interface 710 can be coupled to processor element 702. Other output devices that permit a user to program or otherwise use the computing device can be provided in addition to or as an alternative to network communication unit 708. When the output device is or includes a display, the display can be implemented in various ways, including by a liquid crystal display (LCD) or a cathode-ray tube (CRT) or light emitting diode (LED) display, such as an OLED display. Persons of ordinary skill in the art are aware that the computing device 700 may comprise other components well known in the art, such as sensors, powers sources, and/or analog-to-digital converters, not explicitly shown in FIG. 7. For ease of discussion, FIG. 7 explanation of these other components well known in the art.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application.

What is claimed is:

1. A system, comprising:
    a non-transitory memory; and
    one or more hardware processors configured to read instructions from the non-transitory memory to cause the system to:
        receive a database query;
        parse the database query to identify a plurality of columns in one or more database tables;
        sort at least some columns of the identified plurality of columns based on a database operation in the database query;
        determine a histogram of values for each column of the sorted columns based on characteristics of fields in each column;
        determine a total weight for each column of the sorted columns based on the histogram;
        select a column from the sorted columns based on the total weight for each column; and
        generate a suggested database index based on the selected column.

2. The system of claim 1, wherein a first column of the suggested database index comprises the selected column.

3. The system of claim 1, wherein the total weight comprises an indication of a cardinality of each column.

4. The system of claim 3, wherein selecting the columns comprises selecting the column having a highest indicated cardinality.

5. The system of claim 3, further comprising selecting a second column for the suggested database index based on the total weight for the second column as compared to other columns of the sorted columns.

6. The system of claim 1, wherein the database query comprises database operations on two or more tables, and further comprising:
    selecting a driving table based on a combined total weight of columns associated with each table, and wherein the suggested database index is based on the driving table.

7. The system of claim 1, wherein the selected column is based on a column referenced by a WHERE clause in the database query.

8. A method for suggesting a database index, comprising:
receiving a database query;
parsing the database query to identify a plurality of columns in one or more database tables;
sorting at least some columns of the identified plurality of columns based on a database operation in the database query;
determining a histogram of values for each column of the sorted columns based on characteristics of fields in each column;
determining a total weight for each column of the sorted columns based on the histogram;
selecting a column from the sorted columns based on the total weight for each column; and
generating a suggested database index based on the selected column.

9. The method of claim 8, wherein a first column of the suggested database index comprises the selected column.

10. The method of claim 8, wherein the total weight comprises an indication of a cardinality of each column.

11. The method of claim 10, wherein selecting the column comprises selecting the column having a highest indicated cardinality.

12. The method of claim 10, further comprising selecting a second column for the suggested database index based on the total weight for the second column as compared to other columns of the sorted columns.

13. The method of claim 8, wherein the database query comprises database operations on two or more tables, and further comprising:
selecting a driving table based on a combined total weight of columns associated with each table, and wherein the suggested database index is based on the driving table.

14. The method of claim 8, wherein the selected column is based on a column referenced by a WHERE clause in the database query.

15. A non-transitory computer readable medium containing instructions that, when executed by one or more processors cause a programmable device to:
receive a database query;
parse the database query to identify a plurality of columns in one or more database tables;
sort at least some columns of the identified plurality of columns based on a database operation in the database query;
determine a histogram of values for each column of the sorted columns based on characteristics of fields in each column;
determine a total weight for each column of the sorted columns based on the histogram;
select a column from the sorted columns based on the total weight for each column; and
generate a suggested database index based on the selected column.

16. The non-transitory computer readable medium of claim 15, wherein a first column of the suggested database index comprises the selected column.

17. The non-transitory computer readable medium of claim 15, wherein the total weight comprises an indication of a cardinality of each column.

18. The non-transitory computer readable medium of claim 17, wherein selecting the columns comprises selecting the column having a highest indicated cardinality.

19. The non-transitory computer readable medium of claim 17, further comprising selecting a second column for the suggested database index based on the total weight for the second column as compared to other columns of the sorted columns.

20. The non-transitory computer readable medium of claim 15, wherein the database query comprises database operations on two or more tables, and further comprising:
selecting a driving table based on a combined total weight of columns associated with each table, and wherein the suggested database index is based on the driving table.

* * * * *